(12) United States Patent
Howe (10) Patent No.: US 7,165,703 B1
(45) Date of Patent: Jan. 23, 2007

(54) ELONGATED IMPLEMENT HOLDER ESPECIALLY FOR USE ON BOATS

(76) Inventor: Robert H. Howe, 962 Janet La., Lafayette, CA (US) 94549-4731

( * ) Notice: Subject to any disclaimer, the term of this patent is extended or adjusted under 35 U.S.C. 154(b) by 6 days.

(21) Appl. No.: 10/356,293

(22) Filed: Jan. 31, 2003

(51) Int. Cl.
*B60R 7/00* (2006.01)

(52) U.S. Cl. ............. 224/406; 211/60.1; 211/70.8; 211/194; 211/206

(58) Field of Classification Search ............ 43/21.2, 43/26; 211/60.1, 70.8, 70.5, 70, 95, 105.1, 211/194, 204, 206; 248/514; 224/406
See application file for complete search history.

(56) References Cited

U.S. PATENT DOCUMENTS

| | | | | |
|---|---|---|---|---|
| 2,620,063 A | * | 12/1952 | Stanton | 206/315.1 |
| 3,104,778 A | | 9/1963 | Leonard | |
| 3,118,017 A | * | 1/1964 | Wimbish | 174/97 |
| 3,239,069 A | | 3/1966 | Hollins | |
| 3,429,450 A | | 2/1969 | Lambert | |
| 3,524,572 A | | 8/1970 | Hall | |
| 3,696,920 A | * | 10/1972 | Lahay | 206/370 |
| 4,199,070 A | | 4/1980 | Magnussen | |
| 4,286,630 A | * | 9/1981 | Happer | 138/92 |
| D269,926 S | * | 8/1983 | White | D6/514 |
| 4,415,092 A | | 11/1983 | Boyer | |
| 4,485,930 A | * | 12/1984 | Savelkouls | 211/74 |
| 4,678,087 A | | 7/1987 | York | |
| 4,875,591 A | | 10/1989 | Mikesell | |
| 4,907,767 A | * | 3/1990 | Corsi et al. | 248/49 |
| 4,961,505 A | * | 10/1990 | Moeller | 211/70.8 |
| 5,023,404 A | * | 6/1991 | Hudson et al. | 174/97 |
| 5,072,957 A | * | 12/1991 | Graebe, Jr. | 280/33.992 |
| 5,134,250 A | * | 7/1992 | Caveney et al. | 174/101 |
| 5,249,723 A | | 10/1993 | Lamadelein | |
| 5,544,764 A | | 8/1996 | Cima | |
| 5,615,780 A | * | 4/1997 | Nimetz et al. | 211/49.1 |
| 5,730,303 A | * | 3/1998 | Chow | 211/70.6 |
| 5,749,477 A | * | 5/1998 | Chang | 211/40 |
| 5,803,519 A | | 9/1998 | Daigle | |
| 6,092,675 A | * | 7/2000 | Ramirez et al. | 211/68 |
| 2002/0002791 A1 | | 1/2002 | Thompson | |

* cited by examiner

*Primary Examiner*—Tri M. Mai
(74) *Attorney, Agent, or Firm*—David Pressman (57) ABSTRACT

A convenient and useful holder for elongated implements, such as fishing rods, baseball bats, golf clubs, or other tools. The holder comprises a series of elongated parallel compartments with a vertical wall between and separating adjacent compartments. The top of each wall has a horizontal ribbed member, so that each wall has a T-shaped cross section. The tops of the walls thus cooperate to provide a platform (with or without slots) that one can step or walk upon or use as a utility surface. The compartments have a flat bottom that extends beyond the ends of the walls. A series of short dividers corresponding to the vertical walls extend up from the bottom, thereby forming spaces for the reels of fishing rods, or heads of gold clubs, etc. The holder may be made of two aligned and separated subholders and can be padded on one end to protect the reels of fishing rods. It is especially suitable for use on a deck of a boat, a dock, the ground, or another platform. It holds the implements conveniently so that they can be accessed easily and immediately by a user, without interfering with movement of the user or creating a clutter.

14 Claims, 8 Drawing Sheets

ELONGATED IMPLEMENT HOLDER ESPECIALLY FOR USE ON BOATS

BACKGROUND OF THE INVENTION

1. Field

This invention relates generally to a holder for elongated implements, specifically to such a holder that is especially suitable for use on a boat or other confined place.

2. Prior Art

Heretofore fishing rods, golf clubs, and other elongated implements have been stored in various types of holders. The following is a description of some of these.

U.S. Pat. No. 3,104,778 (1961) to Leonard shows a dispenser for wires cut to a predetermined length; the dispenser is constructed of parallel tubes.

U.S. Pat. No. 3,239,069 (1964) to Hollins shows a storage rack for cosmetics. Its top surface is ribbed.

U.S. Pat. No. 3,429,450 (1966) to Lambert shows a storage rack with modular units. Each module has a tube for holding lipstick containers or the like.

U.S. Pat. No. 3,524,572 (1967) to Hall shows a fish pole carrier for the roof of an auto. Tubes 21 hold the rods at their distal ends and loops 22 hold them at their proximal ends.

U.S. Pat. No. 4,199,070 (1977) to Magnussen, Jr. shows a modular rack. Some modules hold one or two round tubes or square tubes.

U.S. Pat. No. 4,415,092 (1981) to Boyer shows a holder for elongated articles such as crayons. A series of tubes with retention means are formed on a flat support substrate.

U.S. Pat. No. 4,875,591 (1986) to Mikesell shows a implement holder for pencils and the like. It comprises a series of parallel troughs with retention means (FIG. 5).

U.S. Pat. No. 4,678,087 (1987) to York shows a modular ski rack, with parallel staggered channels. It is meant to hold the skis vertically.

U.S. Pat. No. 4,961,505 (1990) to Moeller shows a fishing rod holder comprising two end holders. Each end holder has a series of vertically stacked clamping rings with slots.

U.S. Pat. No. 5,249,723 (1991) to Lamadelein shows a hockey stick carrier. The carrier has two U-shaped channels. Each channel has at its top protruding lips at both sides. Note in FIG. 3 that the two lips 38 and 40 form with the partition between channels a T-shaped member. The lips are not continuous for the entire length of the channel.

U.S. Pat. No. 5,544,764 (1994) to Cima shows a pen holder with a group of integral parallel tubes.

U.S. Pat. No. 5,803,519 (1997) to Daigle shows a rod and reel caddy comprising a frame with a series of short tubes 30 at one end and open clamps at the other end.

Patent Application Publication 2002/0002791 to Thompson shows a fishing rod holder comprising an elongated cylinder with a top cutout and a telescoping cover.

All of the above holders have one or more disadvantages. Some will roll and thus are not suitable for nautical use. Some take a lot of space and thus cannot be used in areas where space is scarce. Some are difficult to access, and take up valuable passage, walking, or movement space. Others cannot hold multiple implements. Some cannot hold fishing rods, with their awkward projecting and relatively fragile reel.

OBJECTS & ADVANTAGES

Accordingly, several advantages of various aspects are to provide an improved holder for elongated implements, particularly one which will not roll, which is suitable for nautical use, which does not take up much space and thus can be used in areas where space is scarce, which is easy to access, which does not take up valuable passage, walking, or movement space, which can hold multiple implements, including fishing rods, with their awkward projecting and relatively fragile reel.

Another advantage of various aspects is to provide such a holder which can be used as a platform or stepping area.

Further advantages of various aspects will become apparent from a consideration of the ensuing description and the accompanying drawings.

SUMMARY

In one aspect I provide a holder for elongated implements, such as fishing rods, baseball bats, golf clubs, or other tools or implements. It is especially suitable for use on a deck of a boat, a dock, the ground, or another platform. It holds the implements conveniently so that they can be accessed easily and immediately by a user, without interfering with movement of the user or creating a clutter. The holder comprises a series of elongated parallel compartments with a vertical wall between and separating adjacent compartments. The top of each wall has a horizontal ribbed member, so that each wall has a T-shaped cross section. The tops of the walls thus cooperate to provide a platform (with or without slots) that one can step or walk on. The compartments have a flat bottom that extends beyond the ends of the walls. A series of short dividers corresponding to the vertical walls extend up from the bottom, thereby forming spaces for the reels of fishing rods, or heads of gold clubs, etc. The holder may be made of two aligned and seperated sub-holders and can be padded on one ends to protect the reels of fishing rods.

REFERENCE NUMERALS

10 ribbed top
10A ribbed top
12 sidewall
14 bottom
14A longitudinal ribs
16 partitions
18 bumper
20 subholder
22 fishing rod 24 bumpers openings
26 slot
28 powerboat
30 fishing rod shaft
32 fishing rod line guide
34 hinge

Figure 1:
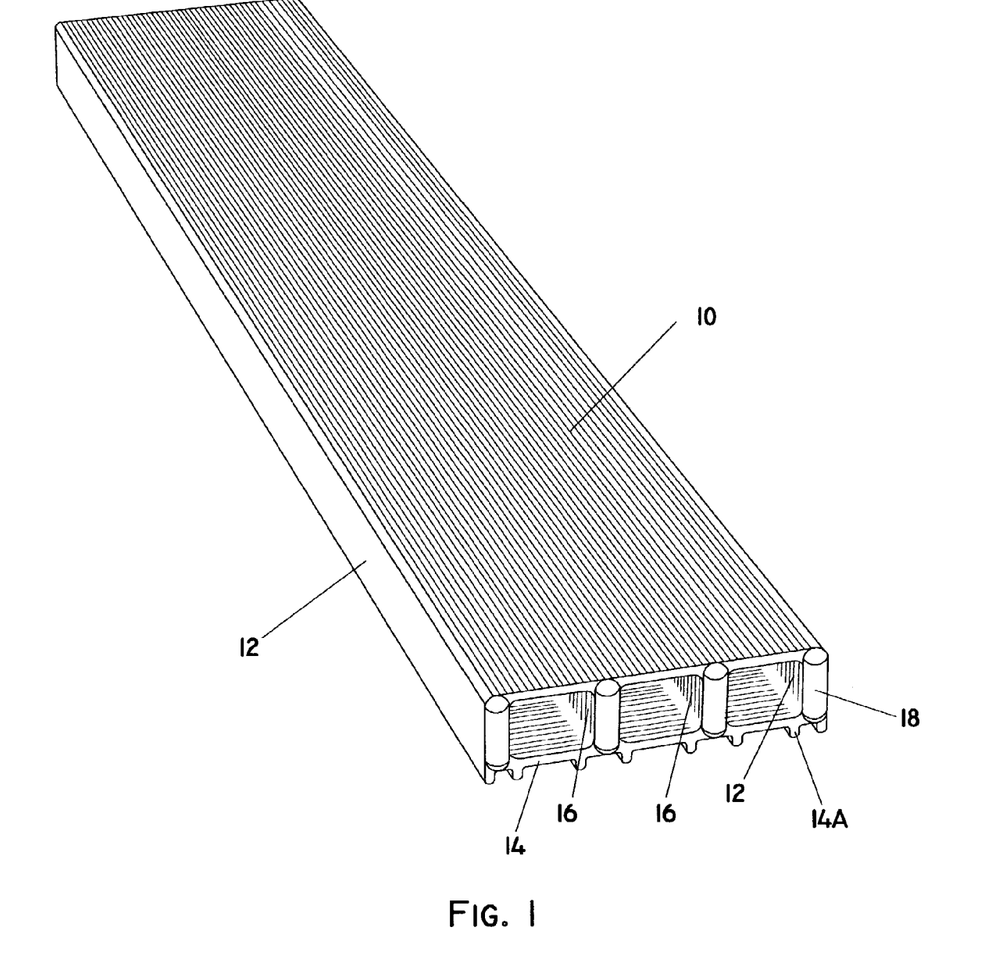
FIG. 1 is a perspective view of a holder with a non-slotted top in accordance with the invention.
Figure 2:
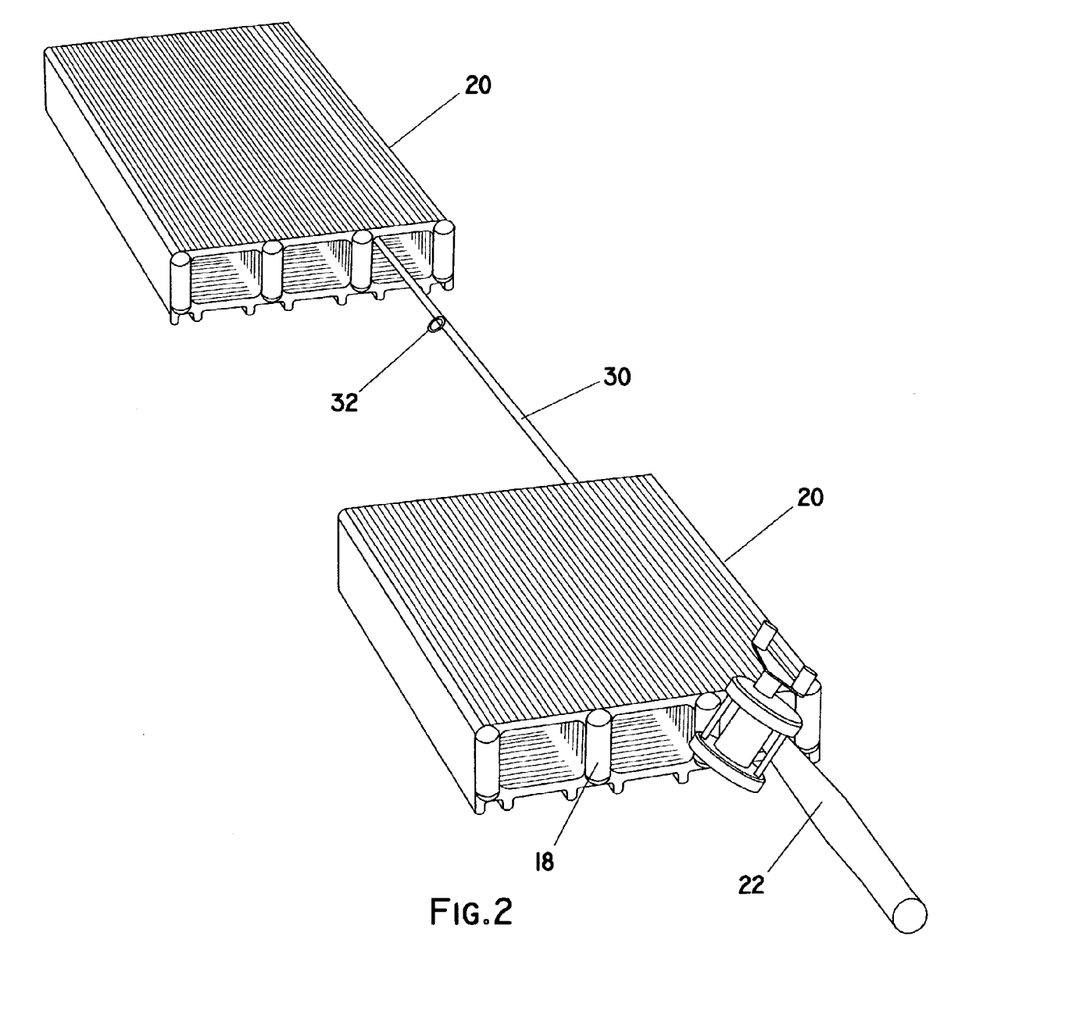
FIG. 2 is a perspective view of two short versions of the holder of FIG. 1 holding a fishing rod.
Figure 3:
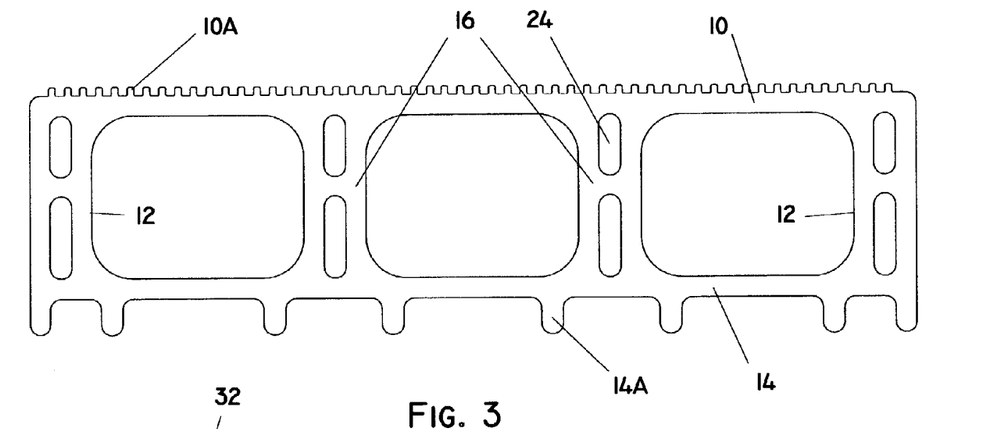
FIG. 3 is an end view of the holder of FIGS. 1 and 2.

DETAILED DESCRIPTION—EMBODIMENT
WITH NON-SLOTTED TOP—FIGS. 1, 2, AND 3

FIG. 1 is view of a holder with a non-slotted, continuous top in accordance with the invention. The holder comprises an elongated rectangular box or compartment with a rectangular ribbed top 10, two sidewalls 12 that support top 10, and a bottom 14 that is joined to top 10 by sidewalls 12. Bottom 14 has spaced short longitudinal ribs 14A that extend down or below the bottom to help prevent the holder from moving when it is placed on a supporting surface. In addition to sidewalls 12, the holder has two (or more—not shown) compartment dividers or partitions 16 that divide the holder into three elongated compartments or slots. The ends of the holder are open. A resilient bumper such as 18 is attached to the end of each sidewall 10 and partition 16.

In one embodiment the holder was 165 cm long, 27 cm wide, and each of its three compartments measured 5 cm high by 7 cm wide. The holder preferably is made of anodized aluminum, but can alternatively be made of plastic or wood.

In lieu of one elongated holder as shown in FIG. 1, the holder can be made of two shorter subholders 20 as shown in FIG. 2. Each subholder 20 is identical with the long holder of FIG. 1, except that it is preferably about half the length of the former, or about 30 cm long in one embodiment.

The holder of FIG. 1 or 2 can be used to hold elongated implements, such as fishing rods, as shown in FIG. 2, golf clubs, baseball bats, tools, construction equipment (e.g., pipes, wires, rebars), or any elongated members. In FIG. 2 it is shown holding one fishing rod 22. The two subholders are positioned so that their compartments are aligned. The subholders preferably are attached to a supporting surface (not shown) to preserve their alignment. The shaft of the rod is inserted, distal end first, into the proximal end of the proximal subholder and it is pushed forward and guided as necessary until its shaft enters the proximal end of the distal subholder. It is pushed forward until its reel contacts the proximal end of the proximal subholder as shown.

FIG. 3 is an end view of the holder showing a preferred end view of an extruded version of the holder. Note that top 10, sidewalls 12, bottom 14, bottom ribs 14A, and partitions 16 are all integral. The end walls and partitions have openings 24 to hold bumpers 18 and reduce the weight of the holder. Note that top 10 has small ribs 10A that are about 6 mm high, about 7 mm wide, and are spaced about 2 mm apart. All parts are dimensioned approximately in the proportions shown.

Figure 4:
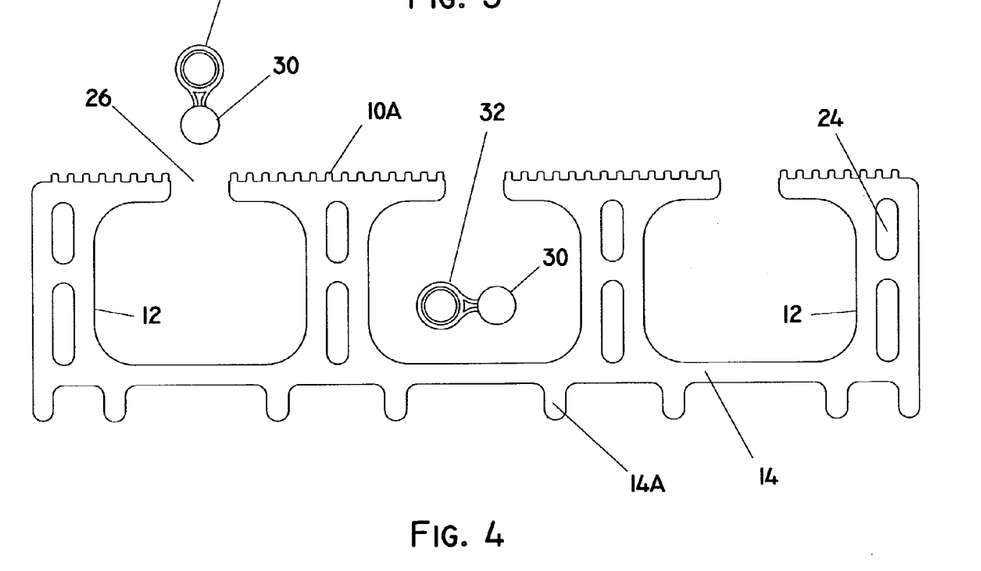
FIG. 4 shows an end view of a holder with a non-slotted top in accordance with the invention.
Figure 5:
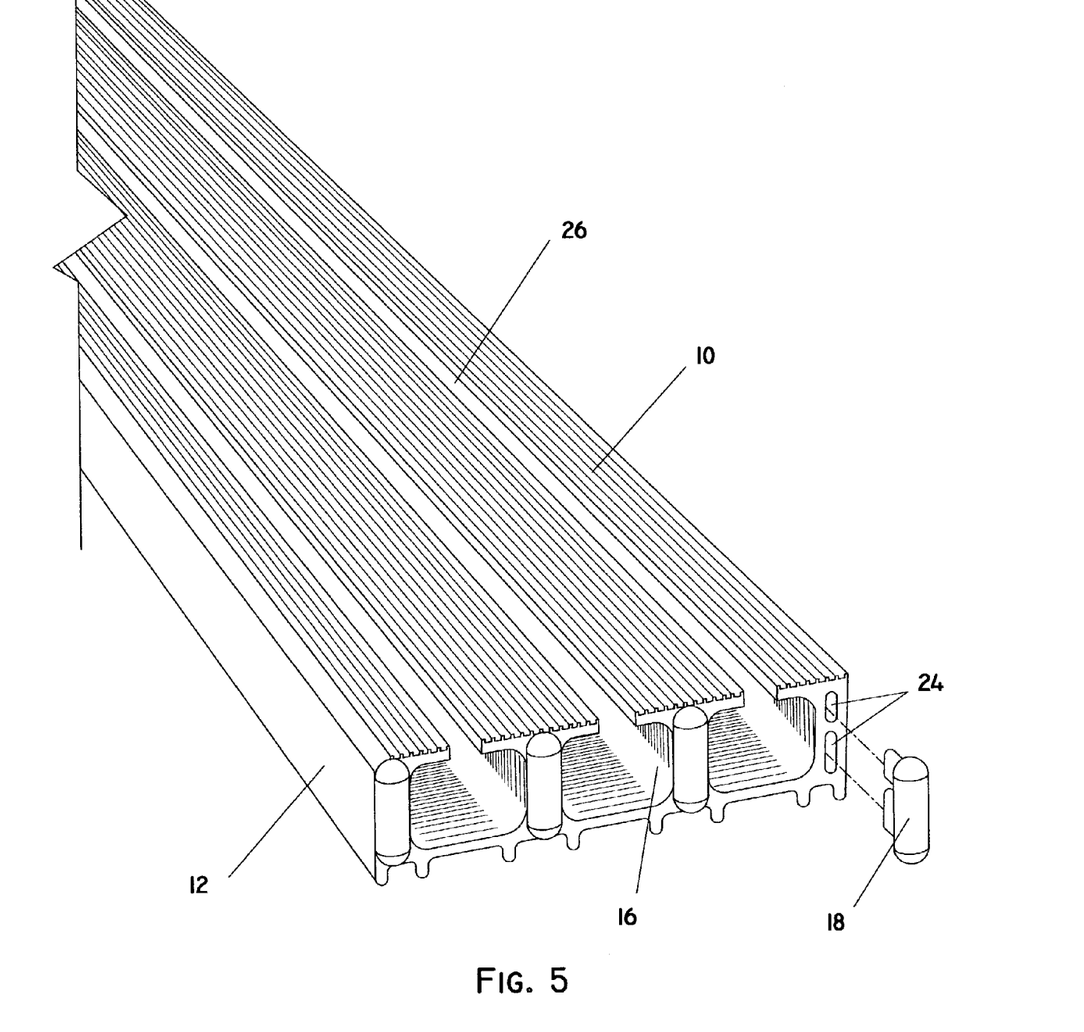
FIG. 5 is a perspective view and partially exploded view of the holder of FIG. 4.
Figure 6:
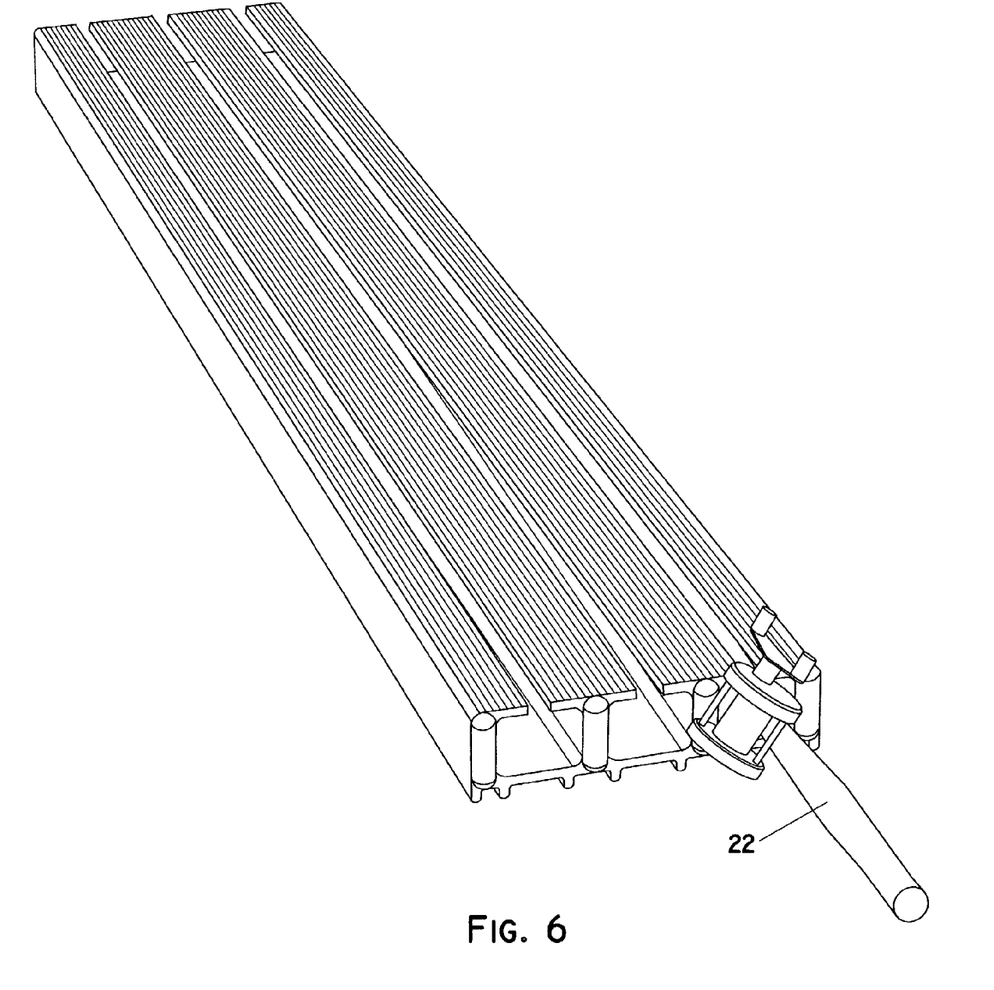
FIG. 6 is a perspective view of the holder of FIG. 4 holding a fishing rod.

DETAILED DESCRIPTION—EMBODIMENT
WITH SLOTTED TOP—FIGS. 4, 5, AND 6

In lieu of the continuous top of FIGS. 1 to 3, the top can be slotted as shown in FIGS. 4 to 6. The holder of these Figs is the same as that of the holder of FIG. 1 or 2, except that the portion of top 10 between and above each partition 16 has a longitudinal slot, such as 26, that extends for the entire length of the holder. In the embodiment under discussion, each slot 26 was 20 mm wide. The partitions or dividers are T-shaped so as to have horizontal tops that extend toward each other to form a slotted top surface of the holder. This makes the slots wide enough so that fishing line guides or loops such as 32 (FIG. 4) attached to a fishing rod shaft 30 will pass through such slots. Note that slot 26 over the leftmost compartment of FIG. 4 is wide enough so that shaft 30 and guide 32, which are vertically oriented and shown positioned over this slot, can pass down through the slot. After the shaft is passed through slot 26 into the compartment below, the rod is rotated 90° as shown in the middle compartment. In this horizontal orientation, the rod and guide are too wide to pass up and out through the slot when boat rocks. E.g., a typical rod may be 13 mm in average diameter and the guides may be 18 mm in outside diameter, so that the combined shaft and guide are 32 mm wide overall. The width of slot 26 is 20 mm as stated above, or 25 mm so that the shaft and loop can pass through sequentially or in the direction of their narrow dimension, as shown over the leftmost compartment, but not in a direction perpendicular to their wide dimension, as indicated in the middle compartment. The width of each slot 26 (20 or 25 mm) is thus about ⅓ or less than the width of its respective compartment (70 mm).

Note from FIG. 5 that bumper 18 has two fingers or tabs that fit into slots 24 in side 12. The tabs hold the bumpers by force fit or by an adhesive (not shown).

Operation

The holder operates and functions to hold any type of elongated implement that can fit into its compartments. In FIG. 2, two subholders 20 are positioned on a surface (not shown) so that their compartments are aligned and attached to the surface by any suitable means (adhesive, clamps, screws, etc). By way of example, I show a fishing rod 22 inserted into the aligned rightmost compartments of the subholders. This is done by inserting the tip of the rod (not shown but most distal from the handle) into the rightmost compartment of the closer subholder. The rod is pushed in so as to cause the tip to move through the compartment and then into the aligned corresponding compartment of the farther holder until the reel contacts the closer end of the closer holder and bumpers 18.

In the case of the longer holder of FIG. 1, the rod (not shown) is similarly inserted all the way until its reel contacts the bumpers and proximal end. This insertion is obviously easier since the tip does not have to be guided from an end into two compartments and since no clearance for inserting the rod from the end is required.

In the case of the slotted holder of FIGS. 4 and 6, the user can insert the rod more easily and from the top. Note in FIG. 4 that the rod, shown in section, has a shaft 30 and a fishing line guide or loop 32 that is attached to the shaft. (The shaft has a plurality of other line guides, but only one guide can be seen since the rest are behind or in front of the one shown.) The rod thus constitutes an elongated instrument that has smaller and larger cross-sectional dimensions normal to each other and to the length or direction of elongation of the rod. As stated, the user simply holds and rotates the rod above the holder and parallel to one of slots 26 so that it has the orientation shown above the leftmost compartment of FIG. 4. I.e., its guides are above its shaft and its larger cross-sectional dimension is vertical and its smaller cross-sectional dimension is horizontal. The rod will now has a narrow horizontal profile so that the user can easily insert it vertically down through one of slots 26 and into the compartment below. Then the rod is turned 90° so that its shaft and line guides are horizontally oriented, as shown in the middle compartment of FIG. 4. This locks it in the compartment since its shaft and guides are too wide to be moved vertically upward through slot 26. The rod is then moved longitudinally so that its reel contacts the bumpers and proximal end. Insertion of the rod is easier in this slotted embodiment since it does not have to be inserted from the end of the compartments.

To remove the rod, the user rotates it so that its shaft 30 and its guides 32 are again vertical, as shown over the left compartment. Then it can be removed by lifting it up vertically through the slot, in the same manner as it was inserted.

Figure 7:
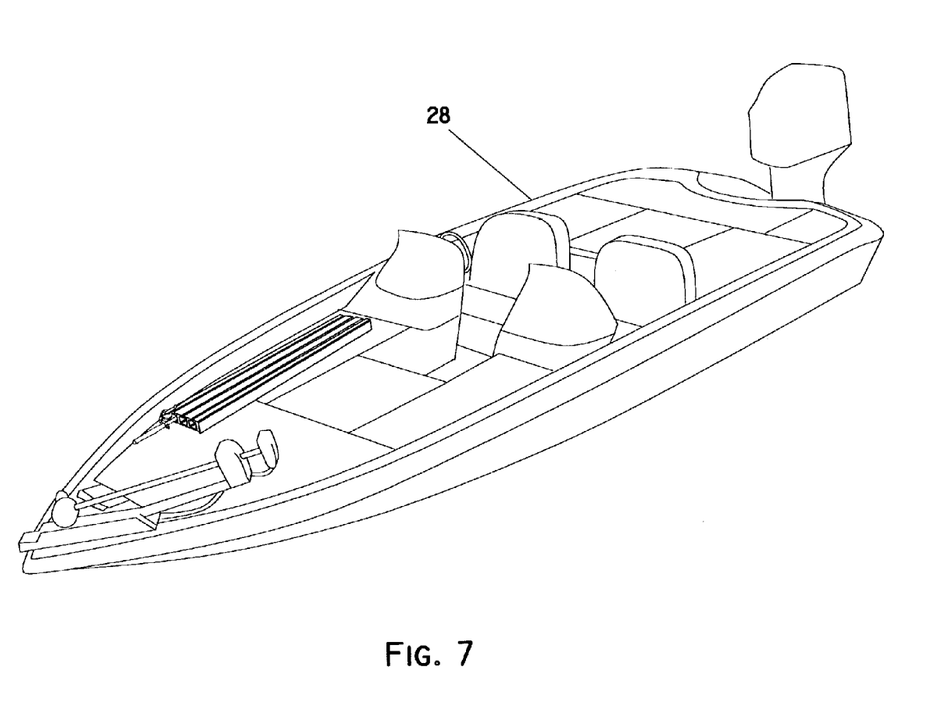
FIG. 7 is a perspective view of the holder of FIG. 4 on a power boat.
Figure 8:
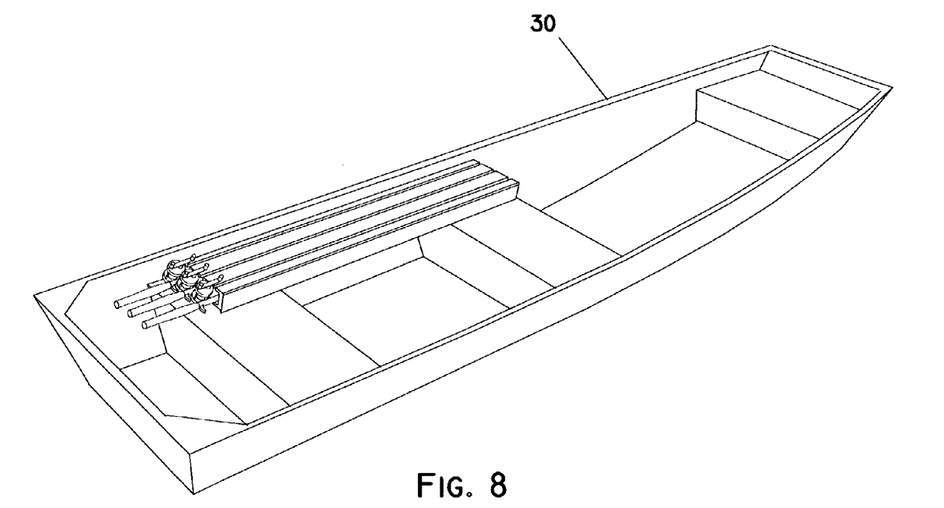
FIG. 8 is perspective view of the holder of FIG. 4 on a row boat.
Figure 9:
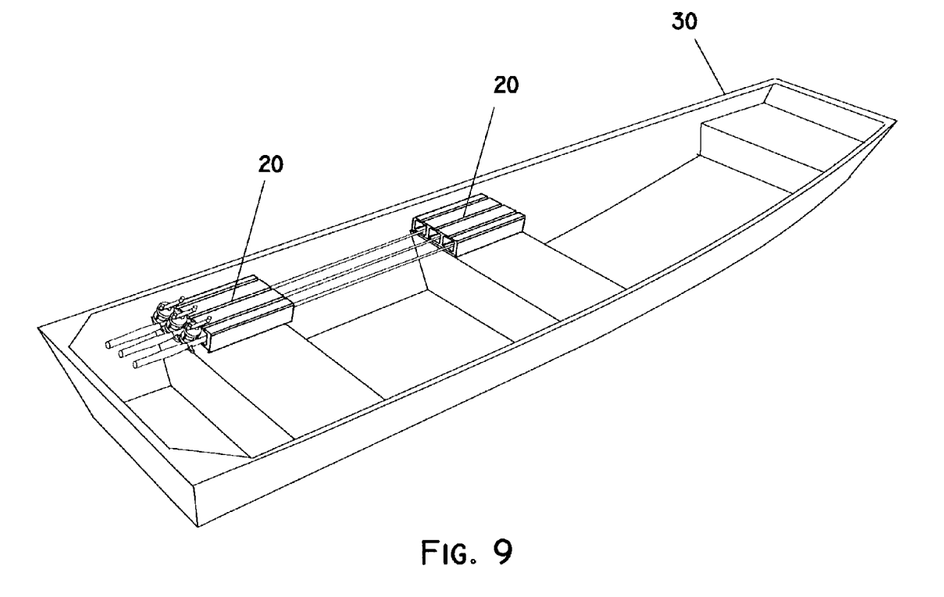
FIG. 9 is perspective view of two short versions of the holder of FIG. 4 on the rowboat.

As shown in FIG. 7, the holder can be mounted on a flat surface of a powerboat. As shown in FIG. 8, it also can be mounted as a bridge between two seats of a rowboat 30. As shown in FIG. 9, two subholders 20 can be mounted on two respective seats, again with their compartments aligned. The subholders will not take up as much space on the boat when there are no rods inserted, but they provide less protection to the rods.

Figure 10:
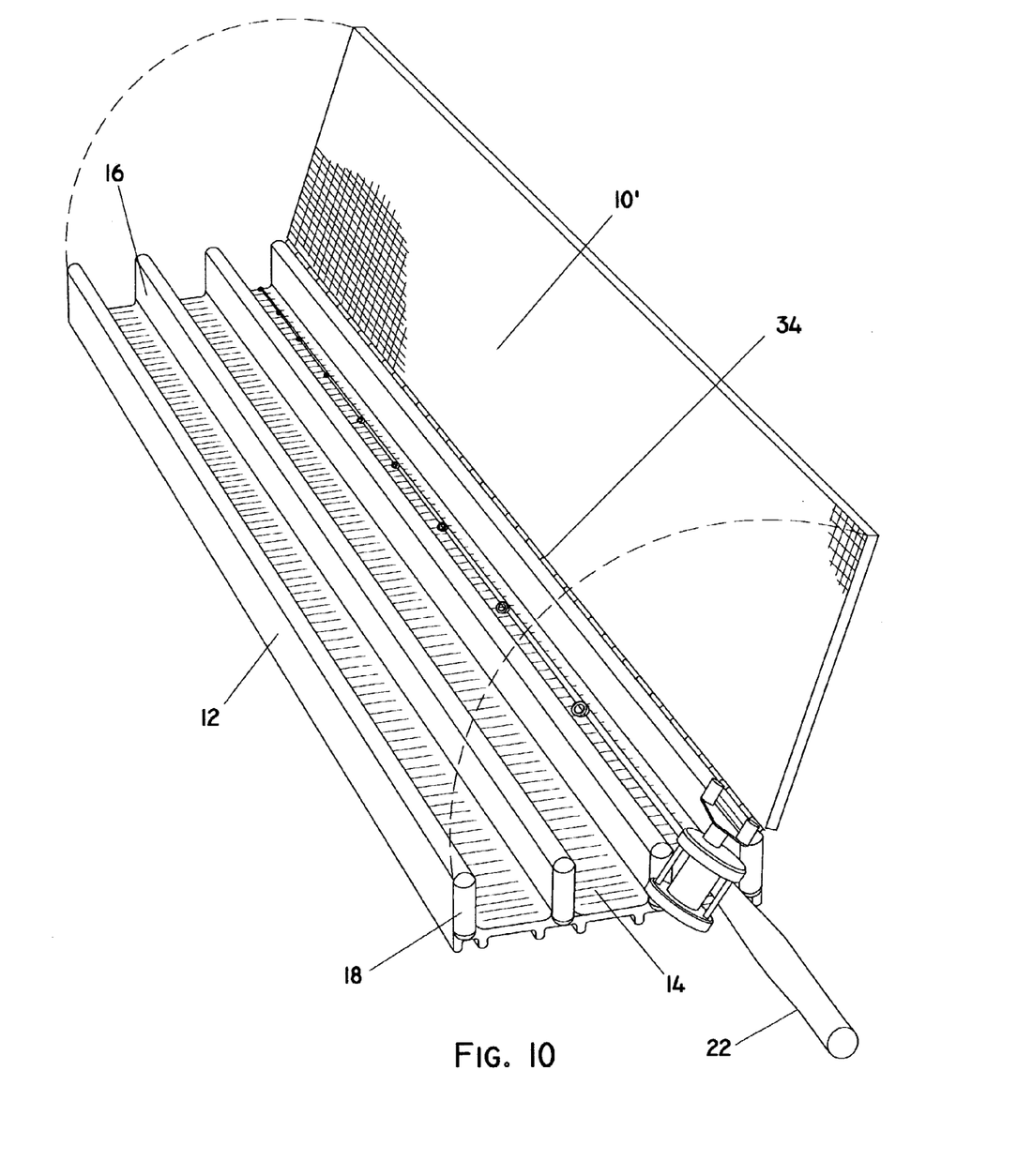
FIG. 10 shows a perspective view of another embodiment of the holder where the top is hinged.

FIG. 10—Embodiment With Hinged Top

In lieu of a fixed top as shown in the previous figures, the top, here designated 10', may be hinged to the top of one sidewall 12 by a piano hinge 34, as indicated in FIG. 10. Otherwise this embodiment is the same as that of FIG. 1. To insert fishing rods or other elongated implements in the compartments of the holder, top 10' is simply opened by lifting it up on its hinge to expose the open compartments and their dividers. Then the implements are simply laid in the compartments, as shown by rod 22. As with the embodiment of FIG. 1, the rod should be positioned longitudinally so that its reel contacts a bumper 18 at the end of its compartment. Top 10' may be optionally locked to the sidewall 12 opposite to the one to which it is hinged by any suitable lock or catch. The advantage of this embodiment is that it is easier to insert the implements into the compartments, once the top is opened.

In any embodiment, the holder(s), having a flat top, or a slotted flat top, can be used as a stepping platform or utility surface, thus performing dual duty. It can be so used regardless of whether or not it is storing fishing rods or other elongated implements.

CONCLUSION, RAMIFICATIONS, AND SCOPE

Accordingly the reader will see that, according to several aspects, I have provided an improved holder for elongated implements. It will not roll and it is especially suitable for nautical use. It does not take up much space and thus can be used in areas where space is scarce. It is easy to access, does not take up valuable passage, walking, or movement space, and it can hold multiple implements, including fishing rods, with their awkward projecting and relatively fragile reel. Also it can be used as a platform or stepping area.

While the above description contains many specificities, these should not be construed as limitations on the scope, but as exemplifications of the presently preferred embodiments thereof. Many other ramifications and variations are possible within the teachings. For example, the holder can be injection molded or formed by any other process. The compartments can have a flat bottom that extends beyond the ends of the walls, in the longitudinal direction. A series of short dividers corresponding to the vertical walls extend up from a portion of the extension of the bottom spaced from the ends of the compartments, thereby forming a wide flat space for the reels of fishing rods, the heads of gold clubs, etc. Stated differently, part of the compartments can be cut away to provide an open area for the reels. This arrangement can be formed by making the holder in two parts, one like the holder of FIG. 1 and the second part an open bottom extension as described that fits into slots or bumper holes 24 in the end of the compartments. In another ramification, the distal ends of the compartments can be seal with plug-in or glue-on wall to prevent rods from being inserted far enough to damage reel or to prevent them from protruding into the boat. The dimensions and materials of the holder can be changed. Also the shapes of the compartments can be changed to oval, round, triangular, etc. The compartment dividers can be other than flat, such as having a triangular, meniscus, or thicker cross-section. More than two subholders can be employed. The bumper shapes can be varied. The holder can be curved in order to hold curved elongated implements. The top or bottom can be plain or can have other types of ribs, rubber bumpers, or padding. The bottom can be eliminated so as to provide a bottomless holder; this is attached to the supporting horizontal surface by adhesive, clamps, braces, fins and screws, etc. The slots in the embodiment of FIG. 4 can be made wider. The top can have troughs as well as slots. In lieu of top ribs 10A (FIG. 4) the top can have a series of any other type of non-flat members or any type of non-slip surface with or without irregularities or distortions to prevent slipping. While FIGS. 1 to 6 show a holder with only three compartments, obviously the holder can have fewer or more compartments. While the above discussion covers positioning or mounting the holder in a horizontal position, obviously it can be mounted obliquely to the horizontal. The compartments can be separate individual compartments that are fastened together.

Thus the scope should be determined by the appended claims and their legal equivalents, and not by the examples given.

I claim:

1. In a holder for holding, on a moveable vehicle, fishing rods of the type comprising an elongated pole which has line guides or loops mounted along one side of said pole and (a) a predetermined relatively large cross-sectional dimension measured normal to said pole and defined by said pole and said line guides or loops, and (b) a predetermined relatively small cross-sectional dimension measured normal to said pole and said relatively large cross-sectional dimension, and defined by said pole or said line guides or loops, the improvement comprising:

a container comprising an elongated bottom wall, a pair of elongated parallel spaced side walls extending up substantially perpendicularly from said bottom wall, and a series of spaced elongated dividers also extending up substantially perpendicularly from said bottom wall and between said side walls, said dividers being substantially parallel to each other and to said side walls, and a top wall that is substantially parallel to said bottom wall and covers and is contiguous to said side walls and said dividers, such that said series of spaced elongated dividers, said bottom wall, said side walls, and said top wall cooperate to form a series of adjacent elongated compartments, with each compartment being bounded (a) on its sides by a pair of said dividers, or a divider and a side wall, and (b) on its top and bottom by said bottom wall and said top wall, each of said compartments being sized to hold a respective one of said fishing rods, an end of each of said dividers having a resilient bumper thereon, said top wall having top and bottom opposing surfaces, said bottom surface being contiguous said tops of said series of dividers, said top surface being a roughened, slip-resistant surface so that it can be used as a secure stepping platform or utility surface to reduce the possibility of accidents, especially during movement of said vehicle, said top wall having a series of parallel slots, said slots being aligned with said respective elongated compartments so that each slot overlies a respective compartment and is spaced from each of a pair of dividers or a divider and a side wall, said slots being free of any covering or obstruction thereabove so that a fishing rod can be inserted into each compartment through the slot overlying its respective compartment, the width of each slot being about ⅓ or less of the width of its respective compartment and less than said first cross-sectional dimension of said fishing rods and greater than said second cross-sectional dimension of said fishing rods, whereby said holder can securely hold a plurality of said fishing rods in said respective compartments by inserting said fishing rods into said compartments, respectively, by positioning each fishing rod over and parallel to the slot overlying a respective one of said compartments so that said fishing rod's relatively small cross-sectional dimension is parallel to said top wall and its relatively large cross-sectional dimension is perpendicular to said top wall, inserting said fishing rod through said slot into said compartment, and allowing said fishing rod to be oriented so that its relatively small cross-sectional dimension is perpendicular to said top wall and its relatively large cross-sectional dimension is parallel to said top wall, thereby preventing said fishing rod from easily falling out of said compartment, and said top wall can be used as a secure stepping platform or utility surface.

2. In a method of holding, on a moveable vehicle, fishing rods of the type comprising an elongated pole which contains line guides or loops mounted along one side of said pole and (a) a relatively large cross-sectional dimension measured normal to said pole and in a direction encompassing said pole and said line guides or loops, and (b) a relatively small cross-sectional dimension measured normal to said pole and said relatively large cross-sectional dimension, and in a direction encompassing said pole or said line guides or loops, the improvement comprising:

providing a plurality of joined, elongated, adjacent substantially parallel compartments, each compartment being defined on its sides by a pair of substantially parallel side walls, each side wall having a top edge and a bottom edge, providing a top wall over said side walls, said top wall being generally flat, lying over said side walls, and parallel to the direction of elongation said compartments, said top wall having upper and lower opposing surfaces, said lower surface contiguous said top edges of said side walls, said upper surface facing upwardly so that it can be used as a stepping platform or utility surface, said top wall having a series of slots therein, said slots being (a) symmetrically aligned over said respective compartments and (b) free of any covering or obstruction thereabove so that an elongated implement can be inserted into each compartment through the slot overlying its respective compartment, the width of each slot being about ⅓ or less than the width of its respective compartment and less than said first cross-sectional dimension of said fishing rods and greater than said second cross-sectional dimension of said fishing rods, each of said compartments being sized to hold a respective one of said fishing rods, said upper surface of said top wall being a roughened, slip-resistant surface so that it can be used as a stepping platform or utility surface to reduce the possibility of accidents, especially during movement of said vehicle, providing a bottom wall under said side walls, said bottom wall being generally substantially flat, lying under said side walls, and substantially parallel to the direction of elongation said dividers, said bottom wall having upper and lower opposing surfaces, said lower surface arranged to rest on a horizontal surface on said vehicle, said upper surface providing a bottom or floor for each of said compartments, using said compartments to hold said fishing rods by inserting a plurality of fishing rods into a plurality of said compartments, respectively, by positioning each fishing rod over and parallel to the slot overlying a respective one of said compartments so that said fishing rod's relatively small cross-sectional dimension is parallel to said top wall and its relatively large cross-sectional dimension is perpendicular to said top wall, inserting said fishing rod through said slot into said compartment, and allowing said fishing rod to be oriented so that its relatively small cross-sectional dimension is perpendicular to said top wall and its relatively large cross-sectional dimension is parallel to said top wall, whereby said fishing rods will not easily fall out of said compartments due to motions of said vehicle, and said top wall can be used as a secure stepping platform or utility surface.

3. The method of claim 2 wherein each adjacent pair of said compartments has a common divider and said divider and said side walls are substantially flat.

4. The method of claim 2 wherein said vehicle is a nautical vessel, said holder being mounted on a surface of said nautical vessel.

5. The method of claim 2, further including a resilient bumper on an end of each of said compartments.

6. The holder of claim 2 wherein said roughened, slip-resistant surface is a ribbed surface.

7. The method of claim 4 wherein said top is integral with said side walls.

8. A method for holding, on a moveable vehicle, a plurality of fishing rods, each of which has (a) a direction of elongation, (b) a relatively large cross-sectional dimension measured normal to said direction of elongation, and (c) a relatively small cross-sectional dimension measured normal to said relatively large cross-sectional dimension and to said direction of direction of elongation, said relatively small cross-sectional dimension being smaller than said relatively large cross-sectional dimension, said reds each comprising an elongated pole which contains line guides or loops mounted along one side of said pole, where said a relatively large cross-sectional dimension is measured normal to said pole and in a direction encompassing said pole and said line guides or loops, and said a relatively small cross-sectional dimension is measured normal to said pole and said relatively large cross-sectional dimension, and in a direction encompassing said pole or said line guides or loops, the improvement comprising:

providing a holder having comprising a plurality of joined, elongated, adjacent parallel compartments having a generally substantially flat top wall lying adjacent and parallel to said compartments, said top wall having upper and lower surfaces and a series of parallel slots therein, each slot lying adjacent a respective compartment, each slot having a predetermined width that is shorter than said relatively large cross-sectional dimension and less than said first cross-sectional dimension of said fishing rods, each compartment also bounded by a bottom wall and a pair of side walls, each of said compartments being sized to hold a respective one of said fishing rods, said upper surface of said top wall being a roughened, slip-resistant surface so that it can be used as a stepping platform or utility surface to reduce the possibility of accidents, especially during movement of said vehicle, inserting at least two fishing rods of the type described into two of said compartments, respectively, by positioning each of said fishing rods over and parallel to the slot overlying a respective one of said compartments so that said fishing rod's relatively small cross-sectional dimension is parallel to said top and its relatively large cross-sectional dimension is perpendicular to said top, moving said fishing rod through said slot into said compartment, and allowing said fishing rod member to be oriented so that its relatively small cross-sectional dimension is perpendicular to said top and its relatively large cross-sectional dimension is parallel to said top, whereby a plurality of elongated implements of the type described can be inserted easily into said respective compartments and held securely in said compartments despite motions of said vehicle and said holder can also be used as a secure stepping platform or utility surface.

9. The method of claim 8 wherein said holder is positioned so that said top wall is horizontal and above said compartments.

10. The method of claim 8 wherein said vehicle is a nautical vessel, and further including mounting said holder on a surface of said vessel.

11. The method of claim 8 wherein each adjacent pair of said compartments has a common side wall and where said common side wall and said side alls are substantially flat.

12. The method of claim 8, further including a resilient bumper on an end of each of said compartments.

13. The method of claim 8 wherein said roughened, slip-resistant surface is a ribbed surface.

14. The method of claim 8 wherein said top is integral with said side walls.

* * * * *